United States Patent [19]
Stephens
[11] 3,959,707
[45] May 25, 1976

[54] BATTERY CHARGER HAVING FAST CHARGE RATE AND HIGH RELIABILITY

[75] Inventor: Charles W. Stephens, Orlando, Fla.
[73] Assignee: Martin Marietta Corporation, Orlando, Fla.

[22] Filed: Oct. 1, 1973
[21] Appl. No.: 402,642

[52] U.S. Cl. .................................... 320/39; 320/22; 323/DIG. 1
[51] Int. Cl.² ............................................ H02J 7/04
[58] Field of Search .................. 320/20, 22, 23, 39, 320/40, DIG. 1; 331/151; 323/DIG. 1

[56] References Cited
UNITED STATES PATENTS

| | | | |
|---|---|---|---|
| 2,726,331 | 12/1955 | Robinson | 331/150 X |
| 3,383,584 | 5/1968 | Atherton | 323/DIG. 1 X |
| 3,602,794 | 8/1971 | Westhaver | 320/39 |
| 3,736,489 | 5/1973 | Mullersman | 320/39 X |

*Primary Examiner*—J. D. Miller
*Assistant Examiner*—Robert J. Hickey
*Attorney, Agent, or Firm*—Julian C. Renfro; Gay Chin

[57] ABSTRACT

A battery charger for charging a temperature-sensitive battery in a rapid manner without damage to the battery, such batery being equipped with means for providing a reference voltage whose level changes with battery temperature in a similar fashion to the theoretical battery voltage change with temperature. The battery charger comprises a current-carrying conductor adapted to be connected to one terminal of the battery to be charged, with the conductor including a controlled current limiting switch serving to diminish the average amount of current flowing into the battery at such time as the battery has become patially charged. Means are provided for recurringly turning said switch on and off so as to produce a sawtooth waveform, and means sensitive to the comparison of the reference voltage with the actual battery voltage are arranged to cause a diminishment of the average value of the sawtooth waveform, thus to prevent damage to the batery from heating or from overcharging. The means for providing the reference voltage may be silicon diodes disposed in the battery case, and the diminishment of current may be brought about by causing a decrease in the amplitude of the sawtooth waveform, by causing a spreading of the peaks of the sawtooth waveform, or by the use of both of these techniques.

20 Claims, 12 Drawing Figures

BATTERY CHARGER HAVING FAST CHARGE RATE AND HIGH RELIABILITY

BACKGROUND OF THE INVENTION

Battery chargers enabling the comparatively rapid charge of temperature sensitive batteries, such as nickel-cadmium batteries, are well known in the art. Many of such chargers have utilized various arrangements for preventing damage to the battery during the charging operation, but none of the battery chargers properly regardable as fast chargers are known to have taken into consideration all of the various physical changes that such batteries undergo when they are being rapidly charged, in order to prevent damage.

Although many prior art chargers have sensed both the battery voltage and battery temperature, none have been known to generate a reference voltage which varies in a similar fashion to the theoretical battery voltage, which reference voltage is then used to bring about a particularly effective charging rate. Although prior art devices are known that control average charging current, such have typically utilized a waveform in the shape of a rectangular wave, with very abrupt changes in battery current. This is of course to be contrasted with the highly advantageous sawtooth waveform generated and utilized in accordance with my invention.

SUMMARY OF THE INVENTION

In accordance with this invention I have provided a novel and highly advantageous battery charger utilizing a number of components, including a switch portion and a comparator portion, with these two principal components being interconnected by a control line. The output of the switch portion applies a specific voltage vs. time characteristic to an inductor whose other lead is to be connected to the battery to be charged, with the main flow of current to the battery being through a portion of the switch and through the inductor. As will be more apparent as the description proceeds, my invention is typically used in conjunction with a nickel cadmium battery that is to be charged, with the case of the battery being equipped with a string of diodes that is positioned such that the diodes will be sensitive to temperature changes of the battery during the charging operation.

Suitable connections are made between the battery on charge and the comparator, with one principal connection being from the positive terminal of the battery to the base of one transistor of a differential amplifier that forms a part of the comparator. A separate lead is from the output of the diode string to the comparator, which connects to the base of the other transistor of the differential amplifier portion of the comparator circuit. In this way, as the charge on the battery increases, the comparator is able to function to control the operation of the switch portion of my invention in a highly advantageous manner, such that the optimum charge rate is utilized at all times, consistent with the temperature rise of the battery. The signal on the control line from the comparator is a time varying signal, with the voltage level of this time varying signal controlling the peak current that flows through the switch, and thence through the aforementioned inductor used in the charge path, latter component functioning to afford the comparator an appropriate length of time to react to the changes occurring in the battery as a result of the charging thereof.

The instantaneous charge current flowing to the battery essentially takes the form of a sawtooth, with the switch portion of the invention serving to cut off the increase of instantaneous charge current at a point on the sawtooth determined by the magnitude of the voltage on the control line from the comparator, and to cut off the decrease of instantaneous charge current at the zero point of the sawtooth. The positive going slope of the sawtooth is determined by the reactance of the inductor when taken in consideration with applied power supply voltage and the battery voltage, and the negative slope of the sawtooth is determined by the reactance of the inductor, and the voltage of the battery on charge.

My battery charger is advantageously of such construction that the comparator does not tend to cut back upon the charging rate to the battery as the voltage level of the battery tends to increase during the phenomena called "gassing" that is associated with NiCad batteries. By virtue of the use of the diode string, overcharging of the battery is prevented but, in addition, by the novel comparator circuit arrangement I utilize, I bring about the maximum charge rate permissible within heating guidelines by arranging the circuit to detect the gassing phenomenon.

As a result of this and other novel features of my battery charger, I am able to charge the typical four cell NiCad battery in minutes rather than the hours required by conventional NiCad battery chargers, and even faster than the so-called rapid charger already on the market.

Advantageously, my battery charger is not restricted to recharging NiCad batteries that are in a favorable ambient temperature range, but rather my battery charger may be utilized in any temperature region in which such a battery could function, or in other words, my novel charger is usable both at high temperatures and at low temperatures without modification to either the battery or the charger.

As a result of the high current, pulsing nature of my charger, it possesses certain qualities enabling it to revive batteries which were thought to be no longer useful, and it may well extend the useful life of all batteries used therewith.

It is therefore the principal object of my invention to provide a battery charger of novel and highly advantageous design, such that it can be used in the recharging of batteries, such as NiCad batteries, at a very rapid rate without danger of explosion.

It is another important object of my invention to provide a battery charger that can rapidly charge batteries in any temperature region in which the battery can operate, without change to either charger or the battery being necessary.

It is yet another object of my invention to provide a battery charger usable with NiCad batteries that will take into consideration the "gassing" phenomena associated with NiCad batteries, such that the charging of the battery can take place at the maximum charge rate which the battery will accept without damage.

It is still another object of my invention to provide a novel and highly advantageous battery charger that requires fewer parts than conventional "rapid" chargers, which is more effective than such chargers, and which can be produced at less cost than so-called fast chargers of the prior art.

It is another object of my invention to provide a battery charger having a charging current that varies in the manner of a sawtooth wave, with the comparator portion of my charger being able to cause a diminishment of the peaks of the current wave, and also being able to bring about a timewise separation of the peaks as the battery comes up on charge.

It is another object of my invention to provide a battery charger utilizing a highly advantageous comparator portion, which comparator portion is connected to a terminal of the battery being charged as well as to a diode string disposed in the battery case, with this arrangement making it possible for the comparator to control the flow of current into the battery, while taking closely into consideration all physical changes the battery may undertake during the charging procedure.

It is another object of my invention to provide a battery charger that is very sensitive to temperature changes of the battery, such as will enable a maximum yet safe charging rate at all times.

It is another object of my invention to provide a battery charger of economic and effective design, such that the charging of the battery can be accomplished at a higher rate, consistent with safety, than has previously been possible.

These and other objects, features and advantages of my invention will become more apparent from a study of the appended drawings in which.

Figures 4, 4A, 4B, 5, 5A, 5B, 6, 6A, 6B:
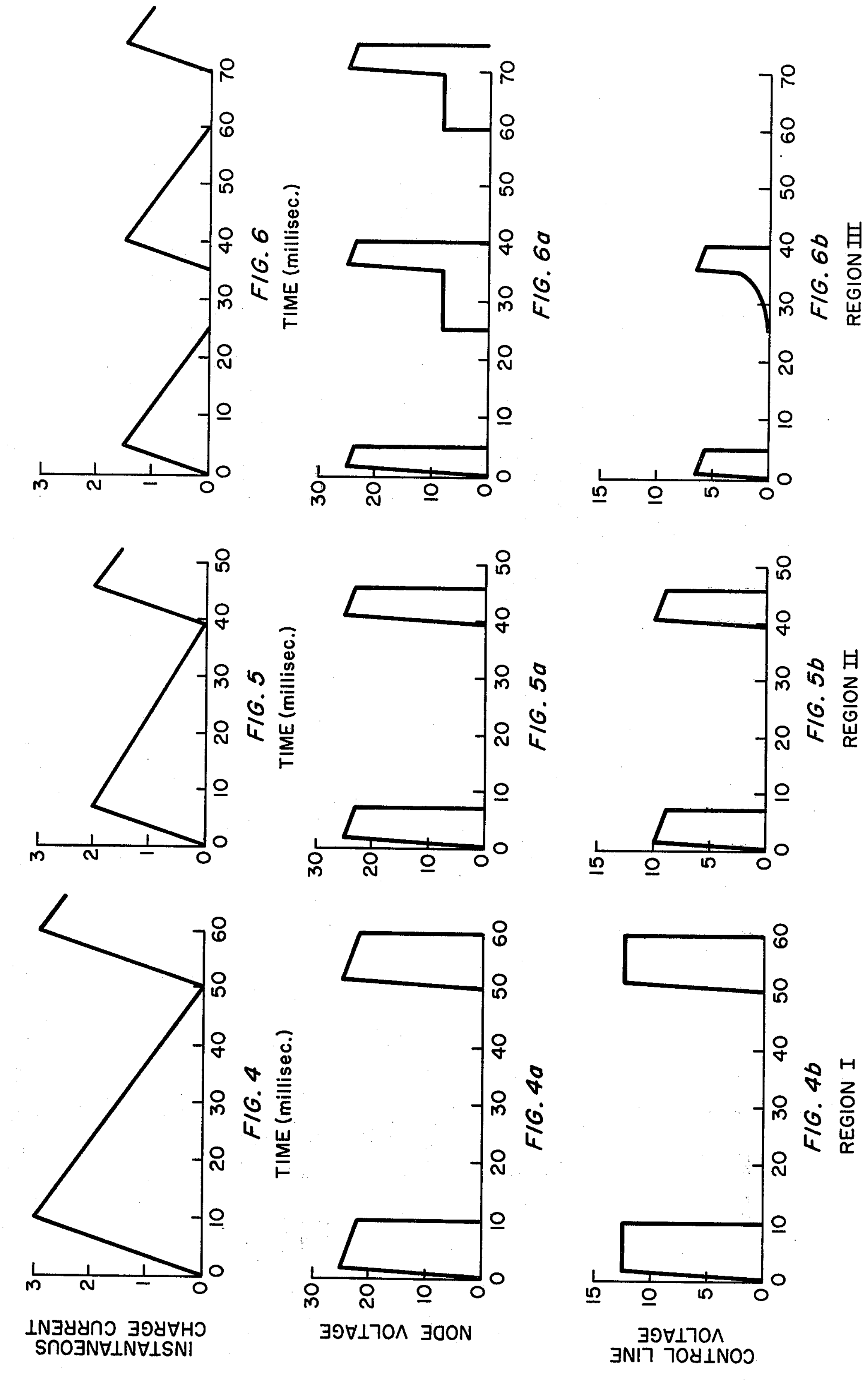
FIGS. 4, 5 and 6 are related figures showing the instantaneous charge current over the switch cycle time, for the three regions depicted in FIG. 3.

FIGS. 4*a*, 5*a* and 6*a* are related figures serving as representations of the instantaneous node voltages over the switch cycle times represented by the instantaneous charge currents for Regions I, II and III; and FIGS. 4*b*, 5*b* and 6*b* are also related figures, these serving as representations of the instantaneous control line voltages over the switch cycle times depicted thereabove.

DETAILED DESCRIPTION

Simplified Embodiment

Figure 1:
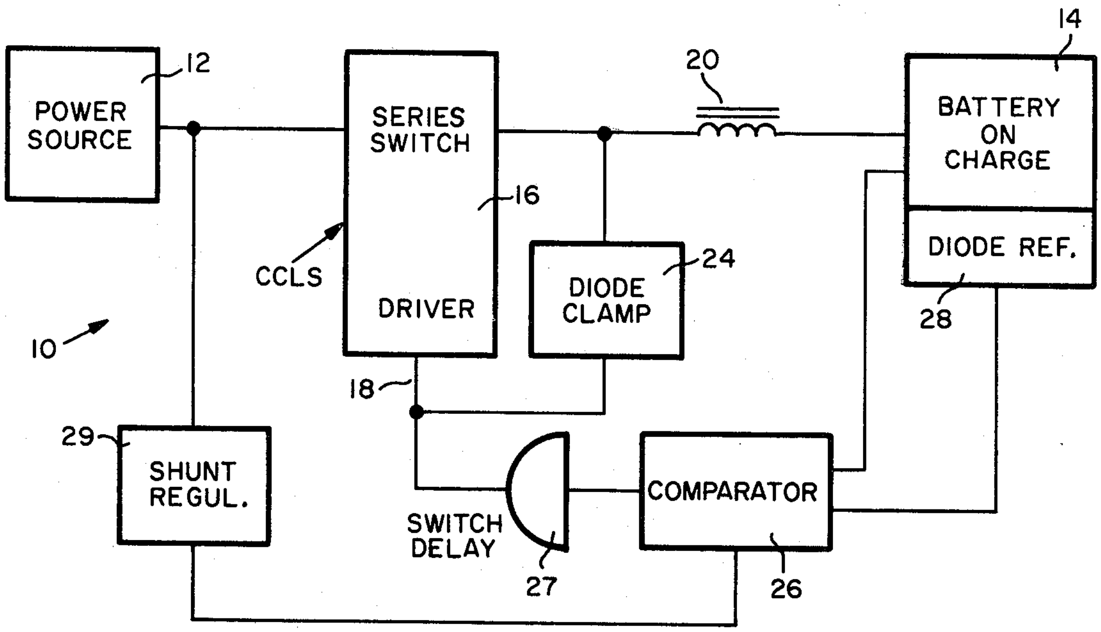
FIG. 1 is a block diagram of a simplified version of my invention.

Turning to FIG. 1, it will there be seen that I have shown in block diagram form, a simplified embodiment of my battery charger 10. The primary power is derived from a source 12 which is at least twice the voltage of the battery 14 to be charged. This voltage is applied to a controlled current limiting switch 16. This switch device referred to as CCLS, serves several functions and its operation is most instrumental to my charger. A control line 18 is illustrated coming into the switch device 16, and with proper control line signal, the device 16 will perform as a switch and apply the power source voltage to the inductance 20. This will cause the current through the path of the switch device 16, the choke 20, and the battery cells 14 to rise.

The flow of current through this path takes place until it reaches a value such that the switch device is caused to open. The inductance of the choke 20 then forces the current through the path of the flyback diode or diode clamp 24, choke 20, and the battery cells 14. With this condition present, the current through this path will diminish until it reaches almost zero. At this time the switch device 16 again closes and the cycle repeats, thus forming a recurring sawtooth waveform.

The diode reference 28, which most importantly is in thermal contact with the cells of battery 14, serves as a reference voltage for the comparator 26. This reference voltage reflects the theoretical terminal battery voltage as determined by battery temperature. Significantly, as the charge of the battery builds up, the comparator 26 functions to reduce the average charge current of the sawtooth current waveform. Such may be accomplished in accordance with this invention by reducing the peak values of the charge current, as well as causing a spreading of the peaks, this being brought about by reducing the voltage level on the control line 18, such that the switch 16 functions to prevent damage to the battery either as a result of overheating or by overcharging.

Figure 3:
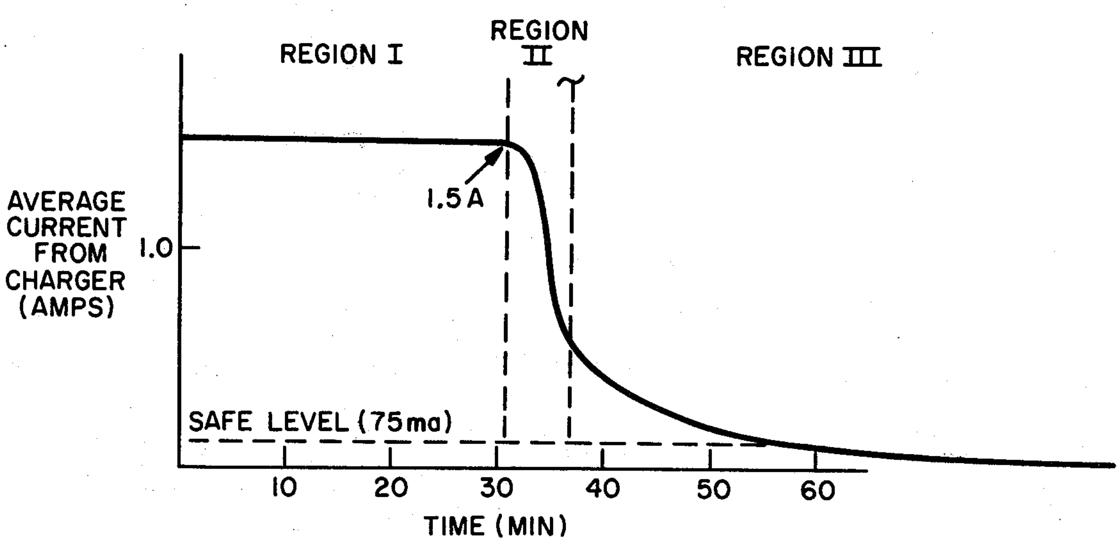
FIG. 3 is a graph representing the average charger current over the battery charge cycle time, with Regions I, II and III being depicted such that a rapid understanding of the charger operation may be achieved.

The switch delay 27 is provided to allow the charger to operate in the high charge current region defined as Region I for a lengthy period before the comparator acts to effect a diminishment of current flow. By proper matching of the characteristics of comparator 26 with the switch delay 27, the rapid, extensive diminishment of the average charge current hereinafter discussed in conjunction with FIG. 3 is made possible at the appropriate time, with the over-all characteristics of my charger being such as to enable it to recharge a battery in a much shorter time than is possible using the so-called "fast" chargers now on the market.

EXEMPLARY EMBODIMENT

Figure 2:
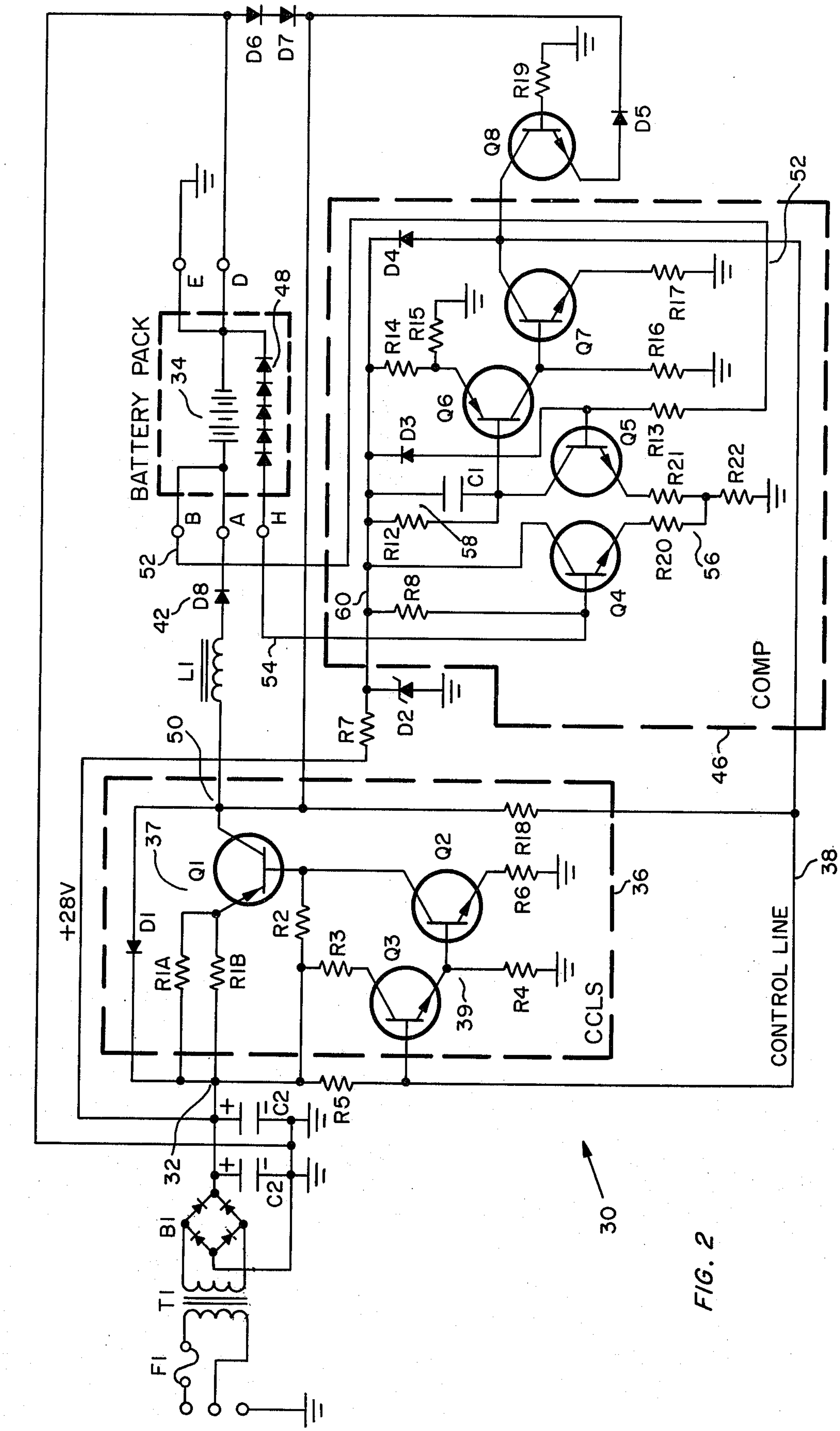
FIG. 2 is a detailed schematic of an exemplary embodiment of my invention.

Turning now to FIG. 2, it will be noted that this figure represents the specific components of the charger shown in block diagram form in FIG. 1.

The battery charger 30 operates from a direct current voltage greater than the rated voltage of the battery 34 to be charged, and an optimum input voltage is several times the rated battery voltage. In the illustrated embodiment, the primary power supply voltage is obtained from a standard alternating current source, such voltage being applied through safety fuse $F_1$ to Transformer $T_1$. Transformer $T_1$ changes the applied voltage to a voltage suitable to the charger design. The new value of alternating voltage is then applied to rectifier bridge $B_1$, which converts the alternating voltage to pulsating direct current voltage. This latter voltage is then applied to capacitors $C_2$, which serve to remove pulsation from the direct current voltage. The direct current voltage across capacitors $C_2$ is the power source for my device.

The DC voltage is applied to point 32, which leads to the Controlled Current Limiting Switch 36. This device is an essential ingredient of my battery charger 30, involving a series switch portion 37, and a driver portion 39. The operation of the CCLS is controlled in a novel way by comparator 46, latter being a device that is quite sensitive to even very small changes in the voltage of battery 34.

A resistor $R_5$ is utilized adjacent the point 32, through which current flows from the source previously described. Inasmuch as $R_5$ is approximately a megohm in size, only a small current is produced, which is applied to the base of input voltage sense transistor $Q_3$ of the Controlled Current Limiting Switch 36. Through Control Line 38, direct current is applied to feedback resistor $R_{18}$ of the CCLS, and simultaneously to the collectors of transistors $Q_7$ and $Q_8$, and the anode of diode $D_4$ of the comparator 46.

A pair of resistors $R_{1A}$ and $R_{1B}$ in the switch portion of the CCLS are connected in parallel to point 32, with the other end of these components being connected to the emitter of main power transistor $Q_1$, which is the principal component of the portion 37 of the controlled current limiting switch 36. The collector of power transistor $Q_1$ is connected to inductor $L_1$, which in turn connects through blocking diode $D_8$ to terminal A of Battery 34, which of course is the battery to be charged. The principal charging current from my battery charger into the battery 34 is through transistor $Q_1$ and the inductor $L_1$, and for convenience I have called out the interconnection of the lead from the collector of $Q_1$ with the lead to the inductor $L_1$ as being node 50, with one end of feedback resistor $R_{18}$ being connected to the node also. The inductor $L_1$ disposed in the principal charging path serves to provide time for the comparator 46 to detect the specific conditions of the battery 34 while it is being charged, and thereafter to react to assure a desirably high charge rate, but at all times a rate such that the battery will not be damaged due to overcharging.

It will be noted from FIG. 2 that associated with battery 34 are a number of connections, which are as follows:

Terminal A is the terminal to which the lead from inductor $L_1$ connects, with this terminal of course representing the positive side of the battery.

Terminal B is connected to the same side of the battery as terminal A, but with terminal B representing a positive potential location that is connected by means of a potential wire 52 through resistor $R_{13}$ to the base of transistor $Q_5$ of the comparator 46, as discussed hereinafter.

Terminal H is the terminus of lead 54 from resistor $R_8$, which terminal is not connected to one of the main posts of the battery 34, but rather connects to the diode string 48 that in accordance with this invention is located inside of the case of battery 34.

Terminal D represents the negative connection of the primary source, which is normally grounded, such as to a location adjacent the capacitors $C_2$, and Terminal E is also connected to the negative terminal of the battery 34, with this representing a connection to the printed circuit board ground. This connection helps remove current induced voltage errors in the comparator function.

BASIC CONDUCTION CYCLE

The comparator 46 of my device serves the important function of supplying an always appropriate voltage to the CCLS 36, to regulate the flow of current through transistor $Q_1$ in such a manner as to assure a current flow determined by the condition of the battery. The comparator principally comprises transistors $Q_4$, $Q_5$, $Q_6$, and $Q_7$; resistors $R_8$, $R_{12}$, $R_{13}$, $R_{14}$, $R_{15}$, $R_{16}$, and $R_{17}$; and diodes $D_3$ and $D_4$. Also involved is an emitter network 56, and an integrating network 58 made up of $C_1$ and $R_{12}$. Resistor $R_7$ is responsible for supplying a sufficient current from a location adjacent point 32, to the lead 60 in order to provide a stable operating voltage for the components of the comparator 46. The magnitude of the voltage supplied to the comparator is determined by the conduction of zener diode $D_2$, which connects between lead 60 and ground. This component, along with $R_7$, amounts to a shunt regulator, which is used to establish a constant voltage supply for the comparator circuit as well as a limiting voltage value for the Control Line 38. In the chosen instance, $D_2$ is a 12 volt zener diode.

With transistors $Q_7$ and $Q_8$ in the off state, the current produced by the voltage across resistor $R_5$ will flow via Control Line 38 through resistor $R_{18}$ to produce, as a result of current flow through $R_{18}$, a voltage on the base of sense transistor $Q_3$ of the CCLS. That voltage is to be of sufficient magnitude to overcome contact voltages developed by base emitter diodes of transistor $Q_3$ and driving transistor $Q_2$, and impresses a voltage across resistor $R_6$. The voltage across resistor $R_6$ produces a current in the emitter of transistor $Q_2$ and by normal transistor operation, most of that current appears in the collector of transistor $Q_2$. That current is applied to resistor $R_2$, producing a voltage on base of main power transistor $Q_1$ which is sufficient to overcome the contact bias of the base emitter junction of transistor $Q_1$, to apply a voltage on resistors $R_{1A}$ and $R_{1B}$ of the CCLS. That voltage produces a current in the emitter of transistor $Q_1$ and by normal transistor action, most of that current appears in the collector of transistor $Q_1$. As will be more fully explained hereinafter, this current is controlled by the comparator 46, and is the primary charging current applied through inductor $L_1$ to the battery.

Due to gain action of transistors $Q_1$, $Q_2$, and $Q_3$, the current at the collector of $Q_1$ is many times larger than the current initiated by the voltage drop across resistor $R_5$. The connection of the collector of transistor $Q_1$ and the return end of resistor $R_{18}$ to node 50 is a significant aspect of my circuit, and it is important to note that, due to bias conditions, the only path the currents flowing from the collector of $Q_1$, and through the resistor $R_{18}$ may take is through inductor $L_1$, with the sum of latter currents producing a positive going voltage change at node 50. With this node voltage going positive and the feedback loop established by virtue of resistor $R_{18}$ to the Control Line 38 and hence to the base of transistor $Q_3$, the voltage on the collector of transistor $Q_1$ will continue to increase until the node 50 reaches a voltage level corresponding to the voltage at the base of transistor $Q_1$, at which time the node voltage stops going positive.

As will be seen by referring to FIG. 4a of the drawing, the node voltage has been increasing quite rapidly, and has now reached the crest or apex, from which point it will decrease comparatively slowly, in the manner represented by the sloped upper portion of the voltage waveform depicted in this figure. As of this moment, the current flow through $L_1$ is quite small as revealed by FIG. 4, but as a result of the voltage reached at node 50, the current flowing through $L_1$ increases in the manner represented by FIG. 4. When, however, the current demand of $L_1$ reaches the critical value to the CCLS as determined by the voltage of Control Line 38 and the value of $R_6$, the node voltage 50 starts to fall rapidly, as depicted by the steep downward slope revealed in FIG. 4a. By feedback action, $R_{18}$ couples this change to the Control Line 38, and forces the CCLS off.

As the collector of transistor $Q_1$ went positive, resistor $R_{18}$ produced a current which caused the Control Line 38 to go positive until the breakdown voltage of zener diode $D_2$ and contact voltage of limiting diode $D_4$ were exceeded. In other words, the zener diode established the maximum voltage the Control Line 38 can reach. Current from resistor $R_{18}$ is shunted by limiting diode $D_4$ and zener diode $D_2$ at that time, thus producing a specific voltage at the base of input voltage sense transistor $Q_3$, that determines, while operating in Region I of FIG. 3, the peak current which the CCLS can conduct.

In the illustrated instance in which the supply voltage is 28 volts, approximately 12.6 volts is applied to the base of $Q_3$, this voltage being derived as the result of the use of a 12 volt zener diode $D_2$, and the contact potential for diode $D_4$ being .6 volts. From this voltage it is necessary to subtract the base-emitter voltage of transistors $Q_2$ and $Q_3$ in the amount of approximately 1.2 volts, leaving approximately 11.4 volts applied across resistor $R_6$. In view of the preferred value for $R_6$ being 100 ohms, a predictable collector current is caused to flow in transistor $Q_2$. By the gain action of $Q_1$ in conjunction with resistors $R_{1A}$ and $R_{1B}$, and $R_2$, the peak current of the charger is determined, which peak current is illustrated in FIG. 4. In the particular embodiment under discussion, this peak current was found to be 3 amperes.

It is to be noted from FIG. 4 that this is a pulsing current, and this fact when considered with the battery temperature sensing characteristics of the reference diodes 48, makes my battery charger able to have the highest current rate possible without endangering the battery.

It is to be realized that the rapid voltage drop depicted in FIG. 4a would have continued were it not for the flyback diodes $D_6$ and $D_7$, which conduct in the manner depicted by the downward slope of the waveform of FIG. 4. The line from the node 50 to the flyback diodes $D_6$ and $D_7$ is two contact voltages below ground, or negative 1.2 volts. This forces a current through diode $D_5$ from the emitter of transmitter $Q_8$. Most of this current comes from the collector of transistor $Q_8$, which removes the current supplied from resistor $R_5$ so that no voltage can be developed across bias resistor $R_{18}$ while diodes $D_6$ and $D_7$ are conducting, or in other words, the transistor $Q_8$ serves the important function of bleeding off the bias current from $R_5$, thus preventing the CCLS from conducting at this time. Resistor $R_{19}$ prevents most of the current supplied from diode $D_5$ from being conducted to ground through the base of transistor $Q_8$. A secondary but necessary feature of diode $D_5$ is that it blocks current from flowing into the emitter of transistor $Q_8$ when the transistor $Q_1$ is in the conducting state. This prevents erratic behavior of the voltage in Control Line 38 during the time transistor $Q_1$ is conducting.

As should now be apparent, with the diodes $D_6$ and $D_7$ conducting, the voltage impressed across inductor $L_1$ is such that the current through inductor $L_1$ decreases. As generally indicated by FIG. 4a, the node 50 is at −1.2 volts while the current is decreasing. When the current level as depicted in FIG. 4 reaches zero amperes, flyback diodes $D_6$ and $D_7$ cease conduction and no current is supplied to diode $D_5$. The current from resistor $R_5$ now develops voltage across bias resistor $R_{18}$ and starts the conduction cycle again.

Diode $D_1$ is a safety device to prevent injurious backward currents from flowing in transistor $Q_1$ when flyback diodes $D_6$ and $D_7$ cease conduction. Resistor $R_3$ is an optional item used to reduce the power dissipation on transistor $Q_3$ during its conduction period.

The above-described operation represents the basic conduction cycle for my battery charger.

DIODE STRING 48

Comparator Resistor $R_8$ derives a constant, very stable current from the comparator's stable power source, line 60, and supplies that current (typically ½ to 1 milliamp) to terminal H, which, as previously mentioned, is connected to the battery diode string 48. These diodes are of course in direct thermal contact with the battery cells under charge, and the voltage across the diodes is determined by the number of diodes and their temperature. The number of diodes utilized in the string is in turn determined by the number of series cells in the battery configuration, and the design of the battery container should be such as to assure that the temperature of the diodes is as nearly the same as the batteries as possible. The voltage developed by these diodes, which are preferably silicon diodes, is used as the reference voltage to determine the status of the battery charge, which reference voltage, as previously mentioned, is applied by means of reference line 54 to the base of transistor $Q_4$.

As an example of the number of diodes utilized with the NiCad battery to be charged, it must first be realized that the nominal theoretical voltage per NiCad cell is 1.33 volts, whereas the nominal voltage for a silicon diode at room temperature is 0.61 volts.

Inasmuch as a proper temperature compensation which requires an equal number of cells, for an arrangement involving four NiCad cells, the voltage would be approximately 5.32 volts. Dividing this product by 0.61 provides a number that when rounded to the nearest whole number turns out to be nine diodes, which is the number of silicon diodes I prefer to use in a nickel cadmium battery having four cells. Quite obviously, a different number of diodes than nine is used if the NiCad battery has a different number of cells than four, or if a different type of battery than a NiCad battery is involved.

The advantage of using diodes in the battery case instead of temperature sensitive resistors entails reasons involving accuracy at low cost, for a predictable and relatively precise reference voltage can be obtained using diodes, and I have found it to be quite unnecessary to make circuit adjustments on a case by case basis.

The preferred manner of connecting the silicon diodes is of course a series arrangement involving cathode connected to anode, with the first anode lead connected to terminal H, and the last cathode lead connected to the negative terminal of the battery, as shown in FIG. 2. Care should be taken in constructing the battery pack such that no electrical conduction is possible from any point in the diode string, other than at the last cathode of course, to the case or cases of the battery cells. I found a thin piece of cardboard was suitable for this purpose.

At the same time, the packaging should be done so as to insure the thermal connection of the diodes to the battery cases. The battery pack is completed by encapsulation of the diode string and battery cell assembly in a suitable thermal insulator so as to aid the diode string in detecting the battery cell temperature to a greater degree than detecting the ambient temperature in the vicinity of the battery. I prefer to use a suitable plastic foam to enclose the over-all assembly, such as Isofoam PE2.

The diodes used could be of germanium instead of silicon, but germanium is typically not advantageous, particularly from the stability standpoint.

ACTION OF THE COMPARATOR 46

As is known, upon the application of a charging current for a short period of time to a battery which was previously discharged, the voltage as measured at the terminals of the battery will tend to increase, and advantageously, the comparator portion 46 of my battery charger is so constructed that it may sense this change in battery voltage, be it very small, and automatically bring about a desirable reduction in the peak magnitude and/or the average magnitude of the battery charging current which flows through transistor $Q_1$, inductor $L_1$ and battery 34. This control action is brought about by the operation of the comparator portion 46 to determine the maximum voltage that the control line 38 can reach and that maximum is, of course, less than the zener diode voltage.

In order for the comparator 46 to perform its function in an optimum fashion, the potential wire 52 is brought directly from the battery 34 positive terminal and connected through resistor $R_{13}$ to the base of transistor $Q_5$. Diode $D_3$ is a safety diode to prevent excessive voltage being applied to the base of transistor $Q_5$, and resistor $R_{13}$ prevents the conduction currents of the safety diode $D_3$ from being excessive. It is also necessary that the series-connected reference diodes 48 be configured so that they are in thermal contact with the battery 34 and properly connected electrically, with the cathode lead of the last diode connected to the negative terminal of the battery. Resistor $R_8$ produces a stable current from comparator voltage supply lead 60, and that current is conducted to terminal H of the diode string 48 by reference wire 54 from the base of transistor $Q_4$. Thus, the reference voltage generated by the diode string 48 is applied to the base of transistor $Q_4$. The transistors $Q_4$ and $Q_5$ function as a differential amplifier, as will be discussed shortly.

Reference to FIG. 2 reveals that the emitter of transistor $Q_4$ is connected to a resistor $R_{20}$, and the emitter of transistor $Q_5$ is connected to resistor $R_{21}$, with the other ends of these resistors each being connected to ground via resistor $R_{22}$. In order that transistors $Q_4$ and $Q_5$ function as a differential amplifier, it is necessary that the sum of the resistance values of resistors $R_{20}$ and $R_{21}$ be much smaller than resistance of resistor $R_{22}$. With this constraint, the sum of the currents in the collectors of transistors $Q_4$ and $Q_5$ is approximately a constant at all times. The difference between the resistance values of resistors $R_{20}$ and $R_{21}$ is such that the currents in the collectors of transistors $Q_4$ and $Q_5$ are equal when the battery voltage is at its theoretical value as applied to the base of transistor $Q_5$, and the diode reference voltage is at its theoretical value as applied to the base of transistor $Q_4$. The sum of these resistances should be large enough to produce the proper gain response, as described in a later discussion.

I have found it highly desirable to utilize the aforementioned integrating network 58 in my comparator, involving the capacitor $C_1$ disposed in parallel with the resistor $R_{12}$ in the portion of the circuit extending between the collector of transistor $Q_5$, and the power lead 60. As will be noted, the base of delay switch transistor $Q_6$ is connected to the juncture of the collector of $Q_5$ and the integrator 58, with this arrangement enabling the differential amplifier to operate the transistor $Q_6$ in such a manner as to advantageously make possible an increased operating time in Region I of FIG. 3. The resistance of the integrating network resistor $R_{12}$ is such that when the collector currents of transistors $Q_4$ and $Q_5$ are equal, the DC voltage at the base of $Q_6$ is such that this transistor turns on.

It should be noted that the collector of transistor $Q_6$ is connected to the base of transistor $Q_7$, which may be regarded as a linear control transistor. When transistor $Q_6$, operating under the constraint of the integrating network, is turned on by the output of the differential amplifier, transistor $Q_7$ endeavors to follow $Q_6$.

The general mode of the comparator operation is such that its end result is to turn on transistor $Q_7$ when the battery attains various levels of charge. In other words, when transistor $Q_7$ is caused to conduct, this brings about a lowering of the voltage on Control Line 38, and this in turn affects the control of the CCLS in such a manner as to reduce the average charging current through $L_1$ to the battery 34. Therefore, it should be apparent that the time constant of the integrating network 58 should be chosen so as to increase in the desired manner, the time of operation of my charger in Region I. More particularly, the time constant of the integrator should be chosen to be sufficiently long as to reduce the effect at the comparator of the voltage produced at the battery by the pulsating charge current I employ. Without the integrator, the pulsating charge current will add a similar appearing voltage waveform on the potential wire 52, which would make the battery appear to the comparator to have reached an artificially high charge level, which would of course unnecessarily prolong the charging of the battery.

Considering the foregoing in more detail, the action of turning on transistor $Q_7$ means that current will flow in its collector circuit. This current, when applied to the resistor $R_{18}$, will produce a voltage on Control Line 38, which will control both the peak current to be conducted by the CCLS, and the time that the bias current from resistor $R_5$ can initiate the CCLS conduction cycle. In order for transistor $Q_7$ to turn on, it is necessary, as previously mentioned, for transistor $Q_6$ to turn on, which is to say that when a current flows in the collector of transistor $Q_6$, that current is applied to resistor $R_{16}$ and the base of transistor $Q_7$. When the current in resistor $R_{16}$ is sufficient to develop enough voltage to overcome the base-emitter diode contact potential, transistor $Q_7$ will start to conduct current in its collector. Emitter degenerating resistor $R_{17}$ employed in the emitter of $Q_7$ serves to produce a linear relationship between the collector current of transistors $Q_6$ and $Q_7$, which of course provides a more linear control of the CCLS by the comparator than would otherwise be possible.

Resistors $R_{14}$ and $R_{15}$ are used to establish a stable bias voltage on the emitter of transistor $Q_6$, and it is necessary for the differential amplifier, involving transistors $Q_4$ and $Q_5$, to deliver enough current in the collector of transistor $Q_5$ so that the resulting voltage developed across the integrating network can exceed this stable bias voltage. At this time, transistor $Q_6$ will turn on and in turn will turn on transistor $Q_7$, which, as previously discussed, will effect a control of the battery charging current.

The stable bias voltage developed by resistors $R_{14}$ and $R_{15}$ applied to the emitter of transistor $Q_6$ provides a delaying function that enables transistor $Q_6$ to serve as the delay switch transistor of the comparator, desirably delaying the effect that transistors $Q_4$ and $Q_5$ have on the Control Line voltage.

In the interests of further clarification, assume that a battery which has previously been discharged is connected into the charger circuit. The initial reference voltage from reference diodes 48 applied to the base of transistor $Q_4$ by line 54 is greater than the battery potential applied by potential wire 52 to the base of transistor $Q_5$, and this condition will cause more current to flow in the collector of transistor $Q_4$ than in the collector of transistor $Q_5$. With the conditions of design previously given, the voltage at the base of transistor $Q_6$ is such that it cannot turn on. Thus transistor $Q_7$ does not turn on, and the Control Line 38 is allowed to operate on its own to provide the maximum charging current to the battery, such that the charger is operating in Region I of FIG. 3. Whereas the reference voltage on line 54 is essentially a steady DC voltage, the battery potential applied to the base of transistor $Q_5$ is a DC voltage with a small sawtooth A.C. voltage, similar to the waveform in FIG. 4, superimposed on it. The voltage change of this sawtooth A.C. waveform is determined by the amount of current supplied by the charger and the dynamic impedance of the battery. When the battery starts to "gas," involving a phenomenon discussed at length hereinafter, its dynamic impedance changes drastically. This means that the potential wire 52 conveys to the comparator a voltage proportional to the amount of gassing as well as the actual battery voltage. As the battery is charged for a period of time, the D.C. voltage of the battery and sawtooth amplitude will increase, and this raises the voltage applied to base of transistor $Q_5$ by the potential line 52. This will produce more current in the collector of transistor $Q_5$, which, when applied to the integrator network, will develop a voltage which will tend to turn transistor $Q_6$ on. With the capacitor $C_1$ present, the effect of the sawtooth component to turn transistor $Q_6$ on is diminished. This amounts to a specific amount of delay that allows the charger to continue the rapid charge rate of Region I as long as possible.

When the peak voltage of the potential wire 52 on the base of transistor $Q_5$ produces enough current in the integrator network to turn on transistor $Q_6$, it does so only at the end of the sawtooth representing the CCLS conduction times. This causes transistor $Q_7$ to turn on near the end of the CCLS conduction time, and the ensuing pulsations of current from $Q_7$ serve to lower the control line voltage to the CCLS. The effects are shown in the waveforms of FIGS. 5, 5a, and 5b and the charger may be regarded as having entered Region II of FIG. 3.

As the charge cycle continues, the D.C. voltage of the potential line 52 continues to rise, which results in $Q_7$ conducting more collector current. As this is done, $Q_7$ will be conducting current for a sufficiently long time in the CCLS cycle time that it will prevent the bias current from resistor $R_5$ from restarting the CCLS conduction cycle until a finite time later than the release time of the flyback diodes. This action produces the waveforms of FIGS. 6, 6a, and 6b and means that the charger is now in Region III of FIG. 3, and will be discussed at greater length hereinafter.

With the double action of the comparator to reduce the peak current per CCLS conduction time and the appropriate reduction in the frequency at which these current pulses are applied to the battery, it is possible to diminish the average charger current to a value which could safely be applied to the batteries indefinitely without damage to the batteries.

It is to be noted that despite the region the charger is operating in, the CCLS will modify its peak conduction current determined by the control line voltage in a time interval much less than the CCLS conduction time. As the point of transition from Region I to Region II is passed, the comparator will act through the integrator network to turn on transistor $Q_6$, but only in the short time interval near the end of CCLS conduction time, which of course is near the top of the positive slopes of the waveform illustrated in FIG. 5. As a result, the peak CCLS conduction current is being modified within an individual cycle time. As the battery continues to charge through Region II, the action of the comparator is such that it causes transistors $Q_6$ and $Q_7$ to conduct more current, and also it increases the time interval at the end of the CCLS conduction time, over which $Q_6$ and $Q_7$ are conducting. This action reduces the average charging current to the battery in accordance with the desired charge rate.

As the time interval of the conduction of $Q_6$ and $Q_7$ increases from the end of the CCLS conduction time, or in other words, as these transistors conduct for longer and longer portions of the positive slope of the waveforms of FIG. 5, and also the positive slope time is reduced by the reduction of the peak current due to action of the control line on the CCLS, the conduction time of transistors $Q_6$ and $Q_7$ will exceed the time of the permissible CCLS conduction time. This bring about the change from Region II to Region III.

Coordinating the foregoing with the drawings, it is to be seen by comparing FIG. 4 with FIG. 5 that the peak current of the CCLS has reduced from 3 amperes to say 2 amperes. This is a most important aspect of my design, in that it reduces any tendency of the battery 34 to overheat during the charging operation. It should also be noted that the width of the node voltage waveform in FIG. 5a is less than the corresponding widths in FIG. 4a, but the peak amplitude of the two waveforms is equal in the two figures. The uniformity of node voltage depicted in these several related figures is a result of the supply voltage to the comparator being relatively unchanged. The peak current of the CCLS drops even further in the circumstance represented by FIG. 6.

As should now be abundantly clear, as the battery voltage builds up, the comparator 46 senses the battery voltage increases, and by making a continuous comparison with the outputs of diodes 48, the comparator supplies a decreasing voltage on Control Line 38 that will ultimately reduce the value of the peak charge current of the CCLS. This action of the comparator is essentially accomplished by the differential amplifier portion of the comparator, involving transistors $Q_4$ and $Q_5$ and the emitter network 56.

The decrease in average current from the charger is depicted in FIG. 3, which reveals the relationship with time of the average DC current used to charge a battery. The interreaction of the controlled current limiting switch, choke, flyback diodes and comparator produces three separate and distinct phases of the battery charging operation which, as will be recalled, have been designated Region I, Region II and Region III.

When the voltage of the battery, as seen by the comparator 46, is low compared to the reference voltage supplied by the diode string 48, the combination produces the maximum allowable charge current, as depicted by Region I in FIG. 3. While in this region of operation, the actual charge current is like the waveform represented in FIG. 4, with current flowing through choke $L_1$, the blocking diode, and the batteries 14. When the slope of this current waveform is positive in direction, the currrent is being conducted from the CCLS 36, whereas when the slope of this waveform becomes negative in direction, the current is conducted through flyback diodes $D_6$ and $D_7$.

As the average battery voltage approaches the reference voltage from the diode string, the comparator senses this condition and reduces the peak current to which the CCLS is allowed to conduct. This is depicted in FIG. 3 as Region II and the associated current waveform is shown in FIG. 5.

Region II of FIG. 3 represents that phase of the charging operation in which the battery voltage has begun to rise and the comparator of my device is endeavoring to at all times complement as a relationship with temperature the increasing in voltage of the battery. It is essential that the integrating network 58 be present in the comparator to allow Regions I and II to exist as shown.

When the average voltage of the battery exceeds the reference voltage of the diode string, the integrating network assumes the dominant role for determining the repetition rate of the CCLS conduction cycles. The result is depicted in FIG. 3 as Region III and the current waveform therefor is shown in FIG. 6.

GASSING OF THE BATTERY

When a NiCad battery reaches say 60% of its charge capacity, a phenomena called gassing occurs. In this state, the internal cell potential does not change, but this phenomena increases the effective cell resistance, and at a high charging current rate, raises the voltage that can be sensed at the terminals of the battery. More specifically, during this time, the internal dissipated power of the battery is increased, which causes heating of the battery, and the heating has the effect of lowering the theoretical charge voltage of the battery. Further, the heating has the effect of causing gassing to increase, and gassing would continue until the internal pressure of the battery exceeded the case limits, at which time an explosion would occur. It is for this reason that it is necessary to decrease charge current as the battery heats.

Due to the fact that the charging current of my device is in the form of a sawtooth waveform, it is not necessary to reduce the charge current as much as is necessary when the direct current techniques of the prior art are used.

It is important to note that any comparator senses via potential wire 52, the increase in voltage occasioned by increase in internal resistance of NiCad battery, as the battery approaches charged condition. More particularly, comparator transistors $Q_4$ and $Q_5$ operate to produce more current in the integrating network comprising $C_1$ and $R_{12}$, so as to reduce through the action of $Q_6$ and $Q_7$, the peak current of the CCLS from the previous mode.

Advantageously, the construction of my charger is such that although the current peaks are still quite high compared to the current level the battery can assimilate, and the charger continues to deliver such current levels, nevertheless a time spread phenomena is utilized, such that the average current flowing into the battery is reduced, thus avoiding any damage to the battery; note the spread between the waveforms of FIG. 6.

With reference to the waveform in FIG. 6*a*, it will be seen that there is a shelf-like region at which time the node voltage goes to the level of the battery. This time period is of varying width, depending upon the state of the charge of the battery, and represents an instance in which neither $Q_1$ nor the flyback diodes are conducting. As the battery becomes more charged, the width of this period becomes greater. It is this action that produces the reduced average current to the battery. The comparator is able to detect this state of battery charge and make use of it by virtue of the selection and balance of the emitter network 56 and integrator network 58, as determined by the battery cell configuration and the number of diodes used in the diode string 48.

As the voltage at the battery rises due to the gassing condition, the average voltage of the battery will appear to be very large. As previously explained, because of the integrator's presence, it retards this tendency of ordinary battery chargers to diminish current at this time, and enables my charger to deliver more current than an ordinary charger could deliver without damaging the battery.

OPERATION SUMMARY

When the charger is operating in Region I, as depicted in FIG. 3, the voltage on Control Line 38, by virtue of positive feedback action, goes to the limiting voltage of diodes $D_2$ and $D_4$ in microseconds, as shown in FIG. 4*b*. When this happens, the normal transistor action of transistor $Q_1$, $Q_2$, and $Q_3$ causes the collector of $Q_1$ to rise to the level of the supply voltage, as shown in FIG. 4*a*. With this voltage impressed across inductor $L_1$, the charging current in $L_1$ rises in the manner of a sawtooth, as shown in FIG. 4. The increased charging current is supplied by the collector of $Q_1$; thus, as this current rises, the collector voltage sags slightly, as shown in FIG. 4*a*, timewise from 0 to 10 milliseconds.

When the collector current, which is the charging current, reaches a critical value determined by the voltage on the Control Line and the designed gain of transistors $Q_1$, $Q_2$ and $Q_3$ by resistors $R_1$, $R_2$ and $R_6$, the collector voltage of transistor $Q_1$ falls rapidly. This causes the voltage on the Control Line to fall rapidly by virtue of the positive feedback in the circuit provided by resistor $R_{18}$. The flyback action of inductor $L_1$ forces the current to flow through the flyback diodes $D_6$ and $D_7$ at this time. This causes the charge current to decrease as shown in FIG. 4 during the period from 10 to 50 milliseconds. While the flyback diodes are conducting, the clamp transistor, $Q_8$ prevents the control line voltage from going positive to turn the charge current on again until the charge current falls to 0 as shown in FIG. 4 at the 50 millisecond point. At that time the Control Line signal starts to rise rapidly again, which causes the cycle to repeat.

When the battery nears the charged condition, the comparator prevents the control line voltage from rising to the limiting voltage of diodes $D_2$ and $D_4$. The action of the over-all circuit is the same except that the peak charging current which transistor $Q_1$ can conduct is reduced. This causes the time which $Q_1$ is conducting to be reduced, and thus causes the time which the current is rising to be reduced. Correspondingly, the flyback time is reduced and hence the frequency of the charge current cycle is increased. Thus the time of increasing current cycle frequency is characteristic of Region II. It is a subtle characteristic of Region II that the peak voltage at the battery as seen on potential wire 52 is greater than the reference voltage, but the average battery voltage is less than the reference voltage.

When the voltage across the battery rises such that the average of that voltage is greater than the reference voltage, the charger system operates in Region III. In this region the comparator operates in such a way that when the charging current drops to zero and the clamp transistor $Q_8$ would allow current limiting switch to turn on by means of resistor $R_{18}$, then control transistor $Q_7$ prevents the turn on action from occurring until the instantaneous battery voltage falls below a specific value determined by the emitter network resistors 56 and the integrating network 58. In this region, the charge cycle time starts increasing by adding a new state in the three representative waveforms. The charge current now holds at zero amps for whatever time is required for the battery voltage to satisfy the comparator requirements.

While in this zero current phase, the collector voltage of transistor $Q_1$ rises to the battery voltage and holds there until regeneration occurs. The voltage of Control Line 38 reflects the dynamics of the battery voltage decay in an inverted form such that it rises as the battery voltage decays. When the control voltage reaches a critical value, determined by the design of the controlled current limiting switch, regeneration then occurs and the controlled current limiting switch then turns on again. The current builds to a peak value and then turns off with the peak current a constant and the turn-off time a variable. As the turn-off time increases, the charge cycle frequency decreases and the average current to the battery decreases until it goes below the "safe" value of the battery.

Advantageously, the arrangement is such that the battery is charged at the fastest rate possible consistent with safety to personnel, and to the battery on charge. Unlike so-called "rapid" chargers now on the market, my charger does not unduly limit charging rate during the gassing of a NiCad battery, when the voltage level of the battery increases.

With regard to the voltage across the diode string as used in this invention, such voltage is determined, when used at constant current as provided by resistor $R_8$, to be a specific voltage which is determined by the work function that is a constant for silicon diodes, and the absolute temperature of the diodes. Therefore, as will be understood, as the battery heats during the charging operation, the voltage supplied by the diode string decreases approximately linearly, which closely simulates the similar decrease in the theoretical battery voltage as the temperature of the battery increases.

TYPICAL COMPONENT VALUES

The following is a listing of typical component values used in an exemplary embodiment of this invention:

| | | | |
|---|---|---|---|
| R1A | 5.6 ohms/3 watts | R12 | 3.32 K |
| R1B | 5.6 ohms/3 watts | R13 | 2.05 K |
| R2 | 56 ohms/1 watt | R14 | 3.32 K |
| R3 | 464 ohms | R15 | 5.62 K |
| R4 | 1 K | R16 | 17.8 K |
| R5 | 1 Meg. | R17 | 383 ohms |
| R6 | 100 ohms/15 watts | R18 | 825 K |
| R7 | 2.15 K | R19 | 100 ohms |
| R8 | 6.81 K | R20 | 154 ohms |
| R9 | 178 ohms | R21 | 215 ohms |
| R10 | 178 ohms | R22 | 2.74 K |

-continued

| | |
|---|---|
| R11 | 2.74 K |

The power dissipation rating of the unspecified resistors is ⅛ watt.

| | | |
|---|---|---|
| C1 | 6.8 μfd 6 V | |
| C2 | 2000 μfd 50 V | Mallory FPO70A |
| Q1 | 2N 3614 | |
| Q2 | 2N 4910 | |
| Q3, Q8 | JAN 2N2222A | |
| Q4, Q5, Q7 | JAN 2N930 | |
| Q6 | JAN 2N2907A | |
| L1 | 35 mH/2 amp | Stancor C2685 choke |
| D1 | JAN 1N 4247 | |
| D2 | JAN 1N 963B | JAN IN 963B — 12 V/400mW Zener |
| D3, 4, 5 | JAN 1N 4153 | |
| D6, D7 | IN 4997 | Motorola |
| B1 | Diode Bridge | Motorola MDA 990-3 |
| T1 | F-41X | Triad Transformer |
| F1 | Fuse Holder | FHN 20G |

CONCLUSION

It should now be abundantly clear that I have provided a novel battery charger producing a charge current in the configuration of a sawtooth waveform, which waveform is particularly advantageous in that it provides a recurring condition such that the comparator has, for control purposes, an extended time period at which the charging current in the battery is very nearly zero. For example, the sawtooth may recur at 20 cycles per second. At these times of very nearly zero current in the battery, the comparator has an opportunity to accurately determine the actual battery voltage without the influence of a charging current, and thus provide a signal of the appropriate level to the Control Line in order to properly activate the CCLS. Such activation of the CCLS may be either cessation of conduction at a predetermined current level, or the delay of initiation of the conduction cycle.

It should be noted that the integrator network used in conjunction with the comparator has been chosen such that the extended time period afforded by the sawtooth waveform with nearly zero battery current will reach a level and very nearly sustain that level through the relatively short conduction time of the CCLS. This over-all operation provides my novel charger with the capability of controlling an optimum charge current based on a comparison of the theoretical voltage of the battery with respect to the reference voltage, this being accomplished at whatever may be the temperature at which the battery may be residing.

It is possible by redesign of the comparator with regard to the interaction of the reference voltage and the actual battery voltage, which may include gain decrease of the comparator, and the redesign of the CCLS in which the amount of positive feedback is increased, to obtain a mode of operation in which the output of the comparator as applied to the delay switch transistor $Q_6$ is such that when the comparator attempts to control the CCLS by signals on the Control Line, the CCLS will operate so as to diminish the average value of the sawtooth shaped charge current waveform by spreading the peaks of that waveform. This result may be obtained without any significant physical change in the exemplary circuit diagram appearing in FIG. 2.

It is also possible within the spirit of this invention to achieve a diminishment of the peak amplitude of the sawtooth shaped charge current, this being brought about by removing the integrating capacitor $C_1$, increasing the amount of gain of the differential amplifier portion of the comparator, and reducing the positive feedback of the CCLS.

Although the technique utilizing the inductor shown in this exemplary embodiment is a feasible and attractive one for achieving the sawtooth waveform, this is not to say that other combinations of active linear current conducting devices making possible a similar type waveform to the battery could not be used. As an example, the CCLS herein described could be redesigned with the addition of certain components such that it could provide the sawtooth waveform without necessitating the use of the inductor. In that instance it would be necessary to increase the power dissipating capability of the resulting active linear current conducting device used in the current line connecting the primary power source from $C_2$ to the battery. The corresponding device in the already described embodiment of my invention is of course $Q_1$. In the redesign, it may be necessary to mount the replacement device on a heat sink structure.

This alternative to the use of the inductor may have size and weight advantages for certain applications, and for example may be a power transistor developing so much heat as to require its heat sink to be physically attached to the outside of the charger.

I claim:

1. A battery charger for charging a temperature-sensitive battery in a rapid manner without damage to the battery, said battery being equipped with means for providing a reference voltage whose level changes with battery temperature similar to the theoretical battery voltage change with temperature, said battery charger being connected to the positive and negative terminals of the battery to be charged and including a current-carrying conductor in which is disposed an active current-conducting switch device, through which device, charge current flows to the battery, said active current-conducting switch device having an input to which is connected a control line, positive feedback means connected to said control line for causing the current through the active current-conducting switch device to increase to a value determined by a signal present on the control line, and thereafter diminish essentially to zero, thus creating a sawtooth shaped charge current, and means sensitive to the comparison of said reference voltage with the actual battery voltage for providing on said control line, a signal to effectuate the operation of said active current-conducting switch device, to bring about a diminishment of the average value of the sawtooth shaped charge current and thereby prevent damage to the battery from heating or from overcharging.

2. The battery charger as defined in claim 1 in which said means for providing a reference voltage includes a series-connected string of diodes disposed in the case of the battery, in thermal contact with the cells of the battery.

3. The battery charger as defined in claim 1 in which the diminishment of the sawtooth shaped charge current is brought about by means for causing a decrease in the peak amplitude of the sawtooth waveform.

4. The battery charger as defined in claim 1 in which the diminishment of the sawtooth shaped charge current is brought about by means for causing a spreading of the peaks of the sawtooth waveform.

5. The battery charger as defined in claim 1 in which the diminishment of the sawtooth shaped charge current is brought about by means for causing both a decrease in the peak amplitude of the sawtooth waveform, and a spreading of such peaks.

6. The battery charger as defined in claim 1 in which said means sensitive to the comparison of voltages is a comparator having a differential amplifier in its input.

7. The battery charger as defined in claim 6 in which said comparator has an integrator in its output, said integrator providing a time delay such that an eventual spreading of the peaks of the sawtooth shaped charge current occurs.

8. A battery charger for charging a temperature-sensitive battery in a rapid manner without damage to the battery, said battery being equipped with means for providing a reference voltage which is similar to the theoretical battery voltage as a function of temperature, said battery charger being connected to the positive and negative terminals of the battery, with one of the connections to the battery utilizing an inductance through which the current flowing to the battery must pass, a controlled current limiting switch through which the charging current must also pass, said switch utilizing an active linear current conducting device having a control line input with positive feedback such as to provide a recurring sawtooth shaped charge current, with the positive slope of the charge current representing the commencement of the flow of current through said inductance to the battery, the termination point of the positive slope being determined by the amount of current flowing through said switch, inductance and battery, as determined by control line voltage, and the negative slope of the charge current representing the decrease of current through an alternative path including the inductance and battery, and comparator means connected for sensing the instantaneous voltage of the battery under charge as well as the reference voltage, and for providing a signal derived from a comparison of such voltages, control line means for connecting such signal from said comparator to said controlled current limiting switch, to bring about, by operation of said switch, an eventual diminishment of the resulting average value of the sawtooth shaped charge current flowing to the battery, such diminishment of current being accomplished in such a manner as to prevent damage to the battery from heating or from overcharging.

9. A battery charger for charging a temperature-sensitive battery in a rapid manner without damage to the battery, said battery being equipped with means for providing a reference voltage which is similar to the theoretical battery voltage as a function of temperature, said battery charger being connected to the positive and negative terminals of the battery, with one of the connections to the battery utilizing an inductance through which the current flowing to the battery must pass, a controlled current limiting switch through which the charging current must also pass, said switch utilizing an active linear current conducting device having an operational characteristic such as to provide a recurring sawtooth shaped charge current, with the positive slope of the charge current representing the commencement of the flow of current through said inductance to the battery, the termination point of the positive slope being determined by the amount of current flowing through said switch, inductance and battery, and the negative slope of the charge current representing the decrease of current through an alternative path including the inductance and battery, and comparator means connected for sensing the instantaneous voltage of the battery under charge as well as the reference voltage, and for providing a signal derived from a comparison of such voltages, control line means for connecting such signal from said comparator to said controlled current limiting switch, to bring about, by operation of said switch, an eventual diminishment of the resulting average value of the sawtooth shaped charge current flowing to the battery, such diminishment of current being accomplished in such a manner as to prevent damage to the battery from heating or from overcharging, said alternative path including the use of flyback diodes.

10. The battery charger as defined in claim 8 in which the diminishment of the sawtooth shaped charge current is brought about by causing a decrease in the peak amplitude of the sawtooth waveform.

11. The battery charger as defined in claim 8 in which the diminishment of the sawtooth shaped charge current is brought about by means for causing a spreading of the peaks of the sawtooth waveform.

12. The battery charger as defined in claim 8 in which the diminishment of the sawtooth shaped charge current is brought about by means for causing both a decrease in the peak amplitude of the sawtooth waveform, and a spreading of such peaks.

13. The battery charger as defined in claim 8 in which said means for providing a reference voltage includes a series-connected string of diodes disposed in the case of the battery, in thermal contact with the cells of the battery.

14. The battery charger as defined in claim 8 in which said positive feedback causes the voltage applied to said inductance to interact with said active linear current conducting device to produce the sawtooth shaped charge current.

15. A battery charger for charging a temperature sensitive battery in a rapid manner without damage to the battery, said battery being equipped with means providing a reference voltage which is dependent upon battery temperature similar to the theoretical battery voltage dependance upon temperature, said battery charger having a primary power source, and also being connected to the positive and negative terminals of the battery, with one of the connections to the battery utilizing an inductance through which the current flowing to the battery must pass, said charger further including an active current-conducting switch device utilizing positive feedback, the presence of such positive feedback causing in said device either a conducting or a non-conducting mode, said device also having a control line input serving to control the magnitude of the current flowing through said active current-conducting device during its conducting mode, said active current-conducting device, when in such conducting mode, causing a positive voltage condition across said inductor and hence causing the current in the inductor and battery to increase, flyback conduction means connected to said inductance such that when there is a current in the inductor and battery, and the active current-conducting switch device is in its non-conducting mode, a negative voltage condition will exist across said inductance, thus means for causing the current through said inductance and battery to decrease and approach zero, comparator means connected for sensing the instantaneous voltage of the battery under charge as well as said reference voltage, and for providing a derived signal output, a control line interconnecting said comparator with said input of said active current-conducting device, upon which control line, said derived signal is present, bias means for causing on occasion, charging current to flow through said active current-conducting device and hence through said inductance and said battery, a positive signal on said control line input in concert with the positive feedback of the active current-conducting device causing an initiation of conduction in said active current-conducting device and therefore the current in the inductor and battery to increase, said current increase continuing until it reaches a predetermined value as influenced by the signal on said control line, said active current-conducting device at such time entering its non-conducting mode and the action of the inductor at such time causing current to be conducted by said flyback conduction means, the conduction taking place in latter means, because of said negative voltage condition, causing the current in said inductor and in the battery to decrease until it reaches nearly zero, such current increase and decrease in the inductor and battery continuing so as to define a sawtooth waveform, such continuing sawtooth waveform providing an essentially constant charging action to the battery until such time as the battery voltage when compared with said reference voltage produces a signal in said comparator, said comparator at such time serving to dimish the signal in said control line, and thus reduce the charging rate of the battery by reducing the peak current conducted by said active current-conducting device, and hence reducing the average charge current to the battery.

16. The battery charger as defined in claim 15 in which an integrator is provided in said comparator, said integrator on occasion serving to provide a delay in the signal in said control line, thereby to cause the spreading of the peaks of the sawtooth waveform.

17. The battery charger as defined in claim 15 in which said means for providing a reference voltage includes a series-connected string of diodes disposed in the case of the battery, in thermal contact with the cells of the battery.

18. The battery charger as defined in claim 15 in which the diminishment of the sawtooth shaped charge current is brought about by causing both a decrease in the peak amplitude of the sawtooth waveform, and a spreading of such peaks.

19. The battery charger as defined in claim 15 in which said comparator has a differential amplifier in its input.

20. The battery charger as defined in claim 15 in which said flyback conduction means involves the use of flyback diodes.

* * * * *